T. E. COOK AND A. T. FREIJE.
LOCK FOR TIRE CASINGS.
APPLICATION FILED FEB. 27, 1919.
1,338,677.
Patented May 4, 1920.
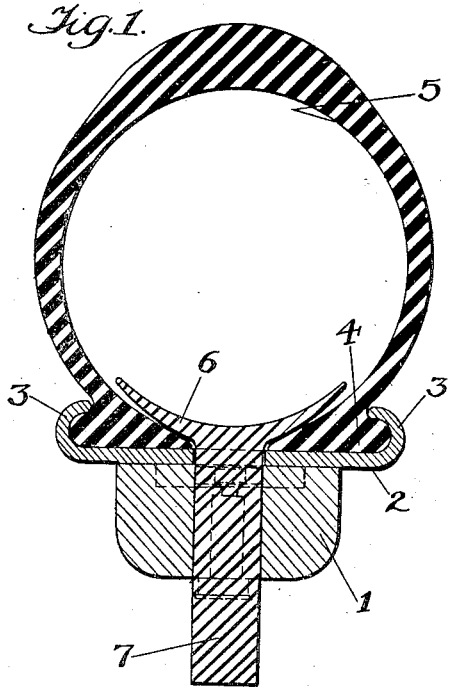
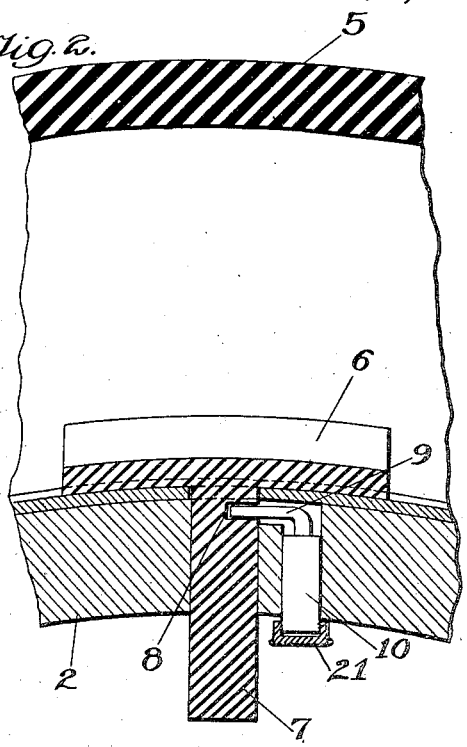
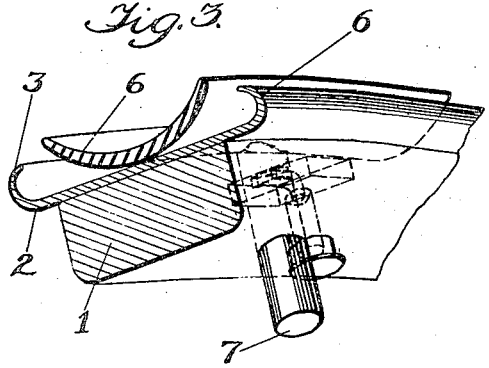
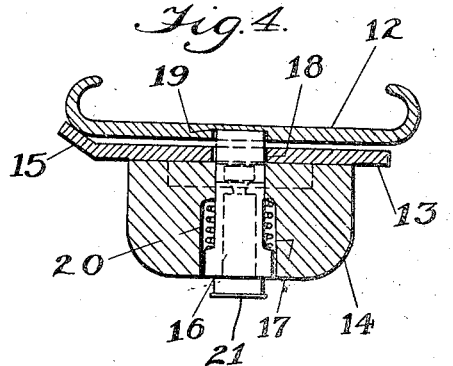
WITNESSES
INVENTOR
A. T. Freije & T. E. Cook
BY
ATTORNEYS

UNITED STATES PATENT OFFICE.

THOMAS E. COOK AND ALEXANDER T. FREIJE, OF RINCON, NEW MEXICO.

LOCK FOR TIRE-CASINGS.

1,338,677.   Specification of Letters Patent.   Patented May 4, 1920.

Application filed February 27, 1919. Serial No. 279,618.

*To all whom it may concern:*

Be it known that we, THOMAS E. COOK and ALEXANDER T. FREIJE, citizens of the United States, and residents of Rincon, in the county of Dona Ana and State of New Mexico, have invented certain new and useful Improvements in Locks for Tire-Casings, of which the following is a specification.

Our invention is an improvement in locks for tire casings, and the invention has for its object to provide mechanism to be used in connection with wheels having clencher rims, for locking the shoe or casing to the rim in such manner that it cannot be removed by unauthorized parties.

In the drawings:

Figure 1 is a radial section through a tire provided with the improved lock;

Fig. 2 is a partial circumferential section at the lock;

Fig. 3 is a perspective view of the locking element, with the felly and rim in section;

Fig. 4 is a radial section through the rim of a wheel provided with a demountable rim, showing the application of the lock to such rim.

In the embodiment of the invention shown in Figs. 1, 2 and 3, the felly 1 of the wheel carries the rim 2, which has the overlying flange 3 for engaging the holding ribs 4 of the shoe or casing 5, to hold the said shoe or casing to the rim. When deflated, the casing may be easily removed from the rim, by crowding out one of the holding beads 4 of the casing from its engaging flange 3.

To prevent this removal of the casing by unauthorized parties, I provide a plate 6 which is shaped to fit upon the adjacent edges of the casing as shown, within the same, to hold the edges of the shoe or casing from inward movement and to thus prevent their displacement from the flanges 3. This plate has a shank 7 which extends through registering openings in the rim 2 and in the felly 1, being of a length to permit the plate 6 to move outward into position such that it will not interfere with the removal of the tire, without disengaging the shank from the openings in the felly and rim.

The shank has a notch or recess 8 which is adapted to be engaged by the bolt 9 of a lock 10 of usual construction, the said lock being arranged within a radial opening 11 in the felly. This lock, which may be of any usual type, as, for instance, a Yale lock, is released from the shank by swinging the bolt with a suitable key. As soon as the shank is released the plate 6 may be pushed outwardly into release position.

In Fig. 4 is shown a construction adapted for demountable rims. In this construction the demountable portion 12 of the rim rests upon a rim 13 which in turn rests upon the felly 14. The rim 12 has the flanges corresponding to the flanges 3 of Fig. 1, and it is demounted by moving the same laterally on the rim 13, the said rim 13 having a flange 15 at one edge, and suitable locking means (not shown) is provided for holding the rim 12 on the rim 13.

The element corresponding to the shank 7 has a locking bar 16, which is arranged within a recess 17 in the felly, and which passes through an opening 18 in the rim 13, to engage an opening 19 in the rim 12, to lock the rim 12 on the rim 13. This bar 16 is normally pressed into released position by a spring 20 arranged within the recess 17 and acting to press the bar inward. The lock 10 and the bolt 9 shown in Fig. 2 may be provided for holding the bar 16 in locking position. In both constructions the shank 7 or the bar 16, as the case may be, is placed diametrically opposite the valve casing, and as the valve casing extends through the felly and the rim, it will be obvious that the said casing will coöperate with the shank or the bar, as the case may be, to lock the casing in place.

It will be noticed that each lock has a screw cap 21 covering its inner end, and that the opening for the locking bolt 16 does not extend entirely through the rim. In order that the extra tire carrier on the rear of the car may be equipped with a lock, since this carrier has no felly, it is obvious that to apply the lock a section of felly must be riveted to the carrier, and this is also true in wire wheels.

We claim:

In combination with a wheel including a felly, a fixed rim and a demountable rim, the felly being provided with a recess and a bore communicating therewith, and the fixed and demountable rims being provided with holes registering with said bore, a locking bolt fitting within said bore and said holes and having its inner end enlarged to form a head fitting within said recess, a coil spring disposed within said recess and normally urging said bolt inwardly toward the center of the wheel, and means for holding said bolt in its outward position engaging within the hole in the demountable rim, said means comprising a lock disposed within the recess in the felly and having a key operated swingable bolt, said first named bolt being provided in one side with a notch for engagement by said lock bolt.

THOS. E. COOK.
ALEXANDER T. FREIJE.

Witnesses:
N. T. FREIJE,
T. E. BOURBONIA.